United States Patent
Park

(10) Patent No.: US 9,170,094 B2
(45) Date of Patent: Oct. 27, 2015

(54) GAP/HEIGHT DIFFERENCE MEASUREMENT MODULE FOR VEHICLE AND CONTROL METHOD THEREOF

(71) Applicant: Hyundai Motor Company, Seoul (KR)

(72) Inventor: Sangkyu Park, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 64 days.

(21) Appl. No.: 14/141,360

(22) Filed: Dec. 26, 2013

(65) Prior Publication Data

US 2014/0294243 A1    Oct. 2, 2014

(30) Foreign Application Priority Data

Mar. 26, 2013 (KR) .................. 10-2013-0032182

(51) Int. Cl.
- G06K 9/00 (2006.01)
- G01B 11/14 (2006.01)
- G01B 11/06 (2006.01)

(52) U.S. Cl.
CPC ............... *G01B 11/14* (2013.01); *G01B 11/06* (2013.01)

(58) Field of Classification Search
None
See application file for complete search history.

(56) References Cited

U.S. PATENT DOCUMENTS

| | | | | |
|---|---|---|---|---|
| 4,165,178 A | * | 8/1979 | Coumo et al. | 356/3.03 |
| 5,280,171 A | * | 1/1994 | Halter | 250/223 R |
| 5,416,590 A | * | 5/1995 | Stover et al. | 356/623 |
| 5,739,913 A | * | 4/1998 | Wallace | 356/401 |
| 5,999,265 A | * | 12/1999 | Dalancon et al. | 356/614 |
| 6,909,799 B1 | * | 6/2005 | Wildmann et al. | 382/152 |
| 8,127,599 B2 | * | 3/2012 | Schommer et al. | 73/117.01 |
| 8,233,040 B2 | * | 7/2012 | Patel et al. | 348/86 |
| 8,482,743 B2 | * | 7/2013 | Segev | 356/625 |
| 8,571,398 B1 | * | 10/2013 | Goddard et al. | 396/25 |
| 2002/0090124 A1 | * | 7/2002 | Soubelet et al. | 382/128 |
| 2009/0040503 A1 | * | 2/2009 | Kilian et al. | 356/23 |
| 2009/0216484 A1 | * | 8/2009 | Schommer et al. | 702/150 |

FOREIGN PATENT DOCUMENTS

KR    2000-0064554 A    11/2000

* cited by examiner

*Primary Examiner* — Jayesh A Patel

(74) *Attorney, Agent, or Firm* — Morgan, Lewis & Bockius LLP

(57) ABSTRACT

A gap and height difference measurement module may include a mounting frame with a flange mounted on a first end thereof and a connecting frame mounted on a second end of the mounting frame, first and second housings mounted on both sides of the connecting frame respectively, a first light source mounted on a lower end of the first housing and emitting light onto the panels, a second light source mounted on a lower end of the second housing and emitting light onto the panels, first and second sensors respectively mounted on front ends of the first and second housings, and first and second filters that are respectively mounted to the first and second sensors so as to allow the first and second sensors to each extract straight-line elements from cross sections formed as the lights emitted from the first and second light are irradiated onto the panels.

13 Claims, 5 Drawing Sheets

GAP/HEIGHT DIFFERENCE MEASUREMENT MODULE FOR VEHICLE AND CONTROL METHOD THEREOF

CROSS-REFERENCE TO RELATED APPLICATION

The present application claims priority to Korean Patent Application No. 10-2013-0032182 filed on Mar. 26, 2013, the entire contents of which is incorporated herein for all purposes by this reference.

BACKGROUND OF THE INVENTION

1. Field of the Invention

The present invention relates to a gap/height difference measurement module for a vehicle and a control method thereof, which detect cross-section data on hemming edges of panels by measuring light sources, even when light, irradiated through the light sources onto vehicle body panels with different colors or with chrome molding, is scattered over the panels, and therefore accurately measure the gap/height difference between the panels of the vehicle body.

2. Description of Related Art

In general, various kinds of panels, such as the roof, hood, doors, and trunk lid, are attached to the body of a vehicle to form the outer appearance of the vehicle body.

Each panel to be attached to the vehicle body should be mounted in such a way as not to produce gaps or height differences with a neighboring panel or the vehicle body. To this end, workers conventionally had to check how well various kinds of panels were mounted, either with a gauge or with the naked eye.

Since the manual gauge check and naked-eye inspection made by workers are dependent upon workers' criteria of quality assessment and their ways of working, it is hard to check accurately whether various kinds of panels are mounted, either correctly or with an error. This leads to low reliability and makes it difficult to provide uniform quality control over vehicle bodies.

To prevent this, automated gap/height difference measurement systems for vehicles are used these days through the method of measuring gaps/height differences between a vehicle body and various kinds of panels with the use of a robot equipped with a camera or sensor.

A gap/height difference measurement module using sensors and light sources is applied to these gap/height difference measurement systems. when light emitted from each light source is irradiated between the panels, the sensors detect straight-line elements from cross sections formed by light through the panels and output them to a controller.

The controller measures the gap/height difference between the panels, based on the horizontal and vertical differences between cross points at curved hemming edges by offsetting the linear axes formed by the straight-line elements output by the sensors.

However, the conventional gap/height difference measurement module as described above has the drawback that, when two panels whose height difference is to be measured have different colors, or one of the panels has chrome molding, the measurement cannot be done with light with the same brightness irradiated from each light source.

As such, while conventional measurement of gaps/height differences between panels having different colors or having chrome molding was done by emitting light of difference brightness from each light source, it has the problems of low measurement accuracy and low measurement reliability, because the light of difference brightness from the panels with different colors or with chrome molding is scattered over the surfaces of the panels, thus making it difficult for the sensors to detect straight-line elements from cross sections formed through the panels by the light of different brightness.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a gap/height difference measurement module for a vehicle and a control method thereof, which are configured to allow sensors to each detect light of different brightness, even when light of different brightness irradiated through light sources is scattered over the panels with different colors or with chrome molding, so as to accurately extract straight-line elements from cross sections formed through the panels by the light of different brightness emitted from the light sources and accurately measure the gap/height difference between hemming edges of the panels, thereby improving measurement accuracy and measurement reliability.

In an aspect of the present invention, a gap and height difference measurement module for a vehicle, which is configured to measure a gap and/or a height difference between hemming edges of panels assembled on a vehicle body, may include a mounting frame with a flange mounted on a first end thereof and a connecting frame mounted on a second end of the mounting frame, first and second housings mounted on both sides of the connecting frame respectively, a first light source mounted on a lower end of the first housing and emitting light onto the panels, a second light source mounted on a lower end of the second housing and emitting light onto the panels, first and second sensors respectively mounted on front ends of the first and second housings, and first and second filters that are respectively mounted to the first and second sensors so as to allow the first and second sensors to each extract straight-line elements from cross sections formed as the lights emitted from the first and second light are irradiated onto the panels.

The gap and height difference measurement module may further include first and second filters mounted on the first and second sensors.

The first sensor extracts straight-line elements, through the first filter, from cross sections formed by the light emitted from the second light source and irradiated onto the panels, and outputs the straight-line elements to a controller.

The second sensor extracts straight-line elements, through the second filter, from cross sections formed by the light emitted from the first light source and irradiated onto the panels, and outputs the straight-line elements to the controller.

The first and second sensors detect lights emitted from the first light source and the second light source, respectively, which are diagonally mounted through the first and second housings.

The first and second sensors may include camera sensors, and the first and second filters are mounted on measurement portions through mounting caps, respectively.

The first light source and the second light source emit light of different brightness, and the brightness is adjusted in response to a control signal from the controller.

In another aspect of the present invention, a control method of a gap and height difference measurement module, may include (a) acquiring images of panels which require gap and/or height difference measurement, and detecting a difference in brightness between the panels due to different colors or chrome molding, (b) identifying images acquired by first and second sensors according to the difference in brightness between the panels detected in the process (a), extracting brightness values of the panels and outputting the brightness values to a controller, detecting a difference between the extracted values between a target value set by the controller by way of comparison and adjusting the brightness of the first and second light sources, and selecting measurement regions of the panels and matching the measurement regions to each other, (c) extracting straight-line elements from cross sections of the panels onto which the first and second light sources irradiate light, in the measurement regions of the panels that are matched in the process (b) and outputting straight-line elements to the controller, and offsetting linear axes created from the extracted straight-line elements, and (d) extracting cross points at curved portions of cross sections of hemming edges of the panels, measuring the gap and/or the height difference in horizontal and/or vertical directions between the extracted cross points.

The process (a) may include acquiring hemming edge images of the panels required to be measured, through the first and second sensors, and detecting the difference in brightness between the panels, caused by the different colors or the chrome molding, based on information acquired through the first and second sensors.

The process (b) may include, when the difference in brightness between the panels is detected in the process (a), identifying the images acquired by the first and second sensor, extracting the brightness values of the panels from the first and second sensors, detecting the difference between the extracted brightness values, which are detected and extracted from the first and second sensors, and the target value, when the difference between the extracted brightness values and the target value is detected, adjusting the brightness of the first and second light sources, and returning to a process of the extracting of the brightness values of the panels from the first and second sensors, when no difference is detected between the extracted brightness values and the target value, selecting measurement regions of the panels, and matching the measurement regions of the panels selected in the process (b) to each other.

The first and second sensors may include camera sensors, and the first and second filters are mounted on the measurement portions through mounting caps, respectively.

The first light source and the second light source emit light of different brightness, and brightness of the first light source and the second light source is adjusted in response to a control signal from the controller.

The process (c) may include when no difference in brightness is detected between the panels in the process (a), or after the process (b) is carried out, extracting the straight-line elements from the cross sections of the panels onto which the first and second light sources irradiate light, in the measurement regions of the panels that are matched in the process (b) and outputting the straight-line elements to the controller, and vertically offsetting linear axes created from the extracted straight-line elements.

The process (d) may include extracting the cross points between offset linear axes and the curved portions of the cross sections of the hemming edges of the panels, and measuring a horizontal gap between two of the cross points extracted in the process (d) and a vertical height difference between the two of the cross points, and completing the measurement of the gap and/or the height difference between the hemming edges of the panels.

The first sensor are mounted on one and the other ends of the first light source and a first housing, and the second sensor are mounted on one and the other ends of the second light source and a second housing, wherein the first and second sensors detect light emitted from the first light source and the second light source, respectively, which are diagonally mounted through the first and second housings.

As described above, the gap/height difference measurement module for a vehicle and a control method thereof according to the exemplary embodiment of the present invention are configured to allow sensors to each detect light of different brightness, even when light of different brightness irradiated through light sources is scattered over the panels with different colors or with chrome molding, so as to accurately extract straight-line elements from cross sections formed through the panels by the light of different brightness emitted from the light sources and accurately measure the gap/height difference between hemming edges of the panels.

As the gap/height difference between the hemming edges of the panels can be accurately measured, improvements in measurement accuracy and measurement reliability can be achieved. Also, because the gap/height difference between the hemming edges of the panels can be accurately measured regardless of whether the panels are different in color and have chrome molding, the gap/height difference measurement module for the vehicle and the control method thereof according to the exemplary embodiment of the present invention can be commonly used for many vehicle types.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
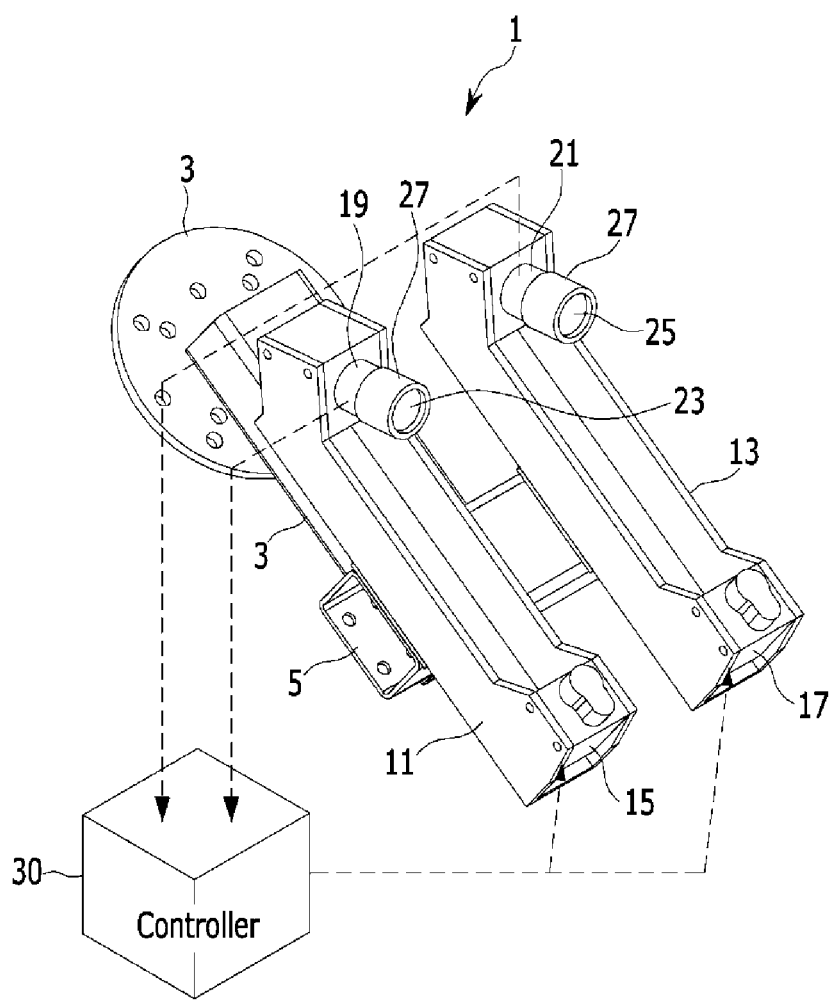
FIG. 1 is a perspective view of a gap/height difference measurement module for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Accordingly, since the exemplary embodiments disclosed herein and configurations illustrated in the drawings are only the most preferable embodiment and are not intended to represent all technical items of the invention, it should be appreciated that other various equivalents and modifications capable of substituting for the disclosed embodiments exist at the filing time point of the invention.

Figure 2:
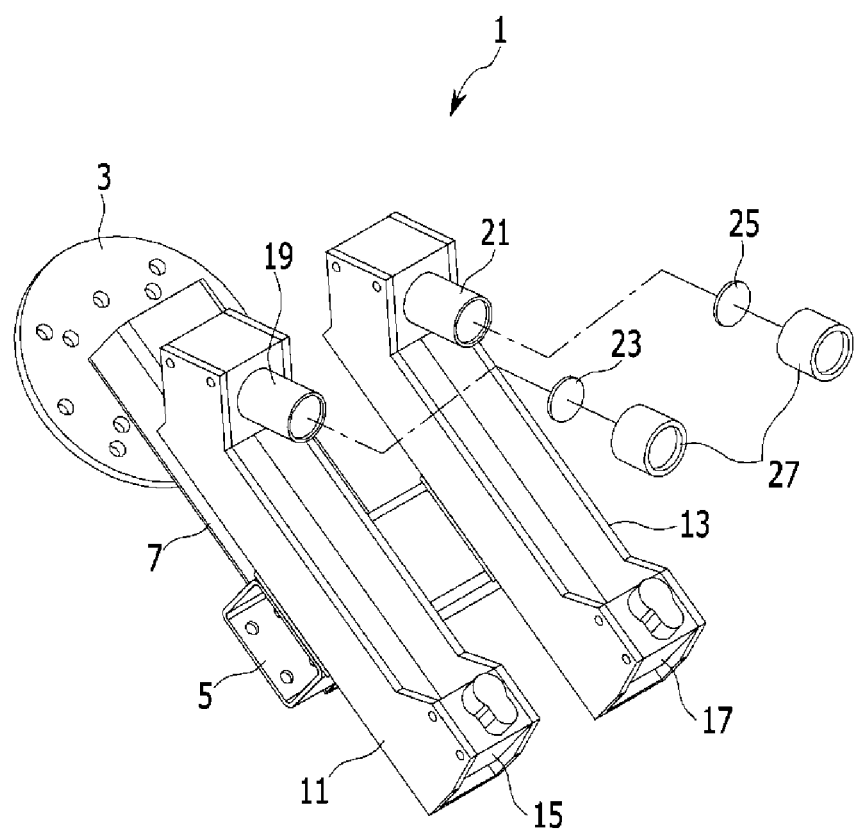
FIG. 2 is an exploded perspective view of the gap/height difference measurement module for the vehicle according to the exemplary embodiment of the present invention.
Figure 3:
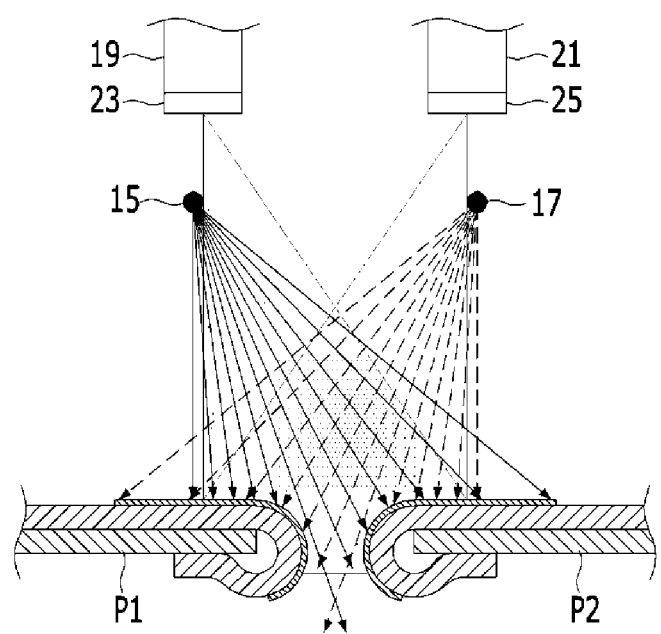
FIG. 3 is a view of the gap/height difference measurement module for the vehicle according to the exemplary embodiment of the present invention while in use.

FIG. 1 and FIG. 2 are a perspective view and exploded perspective view of a gap/height difference measurement module for a vehicle according to an exemplary embodiment of the present invention. FIG. 3 is a view of the gap/height difference measurement module for the vehicle according to the exemplary embodiment of the present invention while in use.

Referring to the drawings, the gap/height difference measurement module 1 for the vehicle according to the exemplary embodiment of the present invention has such a structure that allows sensors 19 and 21 to each detect light of different brightness, even when light of different brightness irradiated through light sources 15 and 17 is scattered over the panels P1 and P2 with different colors or with chrome molding, so as to accurately extract straight-line elements from cross sections formed through the panels P1 and P2 by the light of different brightness emitted from the light sources 15 and 17 and accurately measure the gap/height difference between the hemming edges of the panels P1 and P2, thereby improving measurement accuracy and measurement reliability.

To this end, the gap/height difference measurement module 1 according to the exemplary embodiment of the present invention is configured to measure the gap/height difference between the hemming edges of the panels P1 and P2, which are mounted on the distal end of a robot arm and assembled on a vehicle body, and includes a mounting frame 7, first and second housings 11 and 13, first and second light sources 15 and 17, first and second sensors 19 and 21, and first and second filters 23 and 25.

First of all, a flange 3 to be mounted on the distal end of the robot arm is mounted on one end of the mounting frame 7, and a connecting frame 5 is mounted on the other end.

The first and second housings 11 and 13 are mounted on either side of the connecting frame 5.

In the present exemplary embodiment, the first light source 15 is mounted on the lower end of the first housing 11 and emits light onto the hemming edge portions of the panels P1 and P2, and the second light source 17 is mounted on the lower end of the second housing 13 and emits light onto the panels P1 and P2 in the same manner as the first light source 15.

The first light source 15 and the second light source 17 emit light of different brightness, and the brightness of each can be adjusted in response to a control signal from a controller 30.

The first sensor 19 is mounted on the front end of the first housing 11, and the second sensor 21 is mounted on the front end of the second housing 13.

In this case, the first and second sensors 19 and 21 can detect light emitted from the first light source 15 and the second light source 17, respectively, which are diagonally mounted through the first and second housings 11 and 13.

The first and second filters 23 and 25 are respectively mounted to the first and second sensors 19 and 21 so as to allow the sensors 19 and 21 to each extract straight-line elements from cross sections formed as the light emitted from the first and second light sources 15 and 17 is irradiated onto the panels P1 and P2.

The first and second filters 23 and 25 function to filter the light of the light sources 15 and 17 so that the first sensor 19 and the second sensor 21 sense only the light emitted from one 15 or 17 of the light sources 15 and 17.

The first sensor 19 can extract straight-line elements, through the first filter 23, from cross sections formed by the light emitted from the second light source 17 and irradiated onto the panels P1 and P2, and output them to the controller 30.

The second sensor 21 can extract straight-line elements, through the second filter 25, from cross sections formed by the light emitted from the first light source 15 and irradiated onto the panels P1 and P2, and output them to the controller 30.

In the present exemplary embodiment, the first and second sensors 19 and 21 can detect light emitted from the first light source 15 and the second light source 17, respectively, which are diagonally mounted through the first and second housings 11 and 13.

The first and second sensors 19 and 21 include camera sensors, and the first and second filters 23 and 25 can be mounted on measurement portions through mounting caps 27, respectively.

FIG. 3 is a view of the gap/height difference measurement module for the vehicle according to the exemplary embodiment of the present invention while in use.

Referring to FIG. 3, when the two panels P1 and P2 have different colors or one of the panels P1 and P2 has chrome molding, the gap/height difference measurement module 1 according to the exemplary embodiment of the present invention having the above-described configuration is configured in such a manner that the first light source 15 and the second light source 17 emit light of different brightness to the panels P1 and P2, respectively, and therefore have different wavelengths.

The light emitted from the first and second light sources 15 and 17 is irradiated between the hemming edges of the panels P1 and P2 to form cross sections.

Then, the first sensor 19 extracts, through the first filter 23, straight-line elements from the cross sections formed by the light emitted from the second light source 17 and outputs them to the controller 30, and the second sensor 21 extracts, through the second filter 25, straight-line elements from the cross sections formed by the light emitted from the first light source 15 and outputs them to the controller 30.

The controller 30 creates linear axes from the straight-line elements output from the sensors 19 and 21.

Next, the controller 30 vertically offsets the linear axes by a predetermined value to fit the panels P1 and P2, extracts cross points between the offset linear axes and the curved portions of the cross sections of the hemming edges of the panels P1 and P2, and measures the gap between the hemming edges of the panels P1 and P2 by measuring the horizontal distance between the cross points and measures the height difference between the hemming edges of the panels P1 and P2 by measuring the vertical distance between the cross points.

Hereinafter, a control method of the gap/height difference measurement module having the above configuration according to the exemplary embodiment of the present invention will be described.

Figure 4:
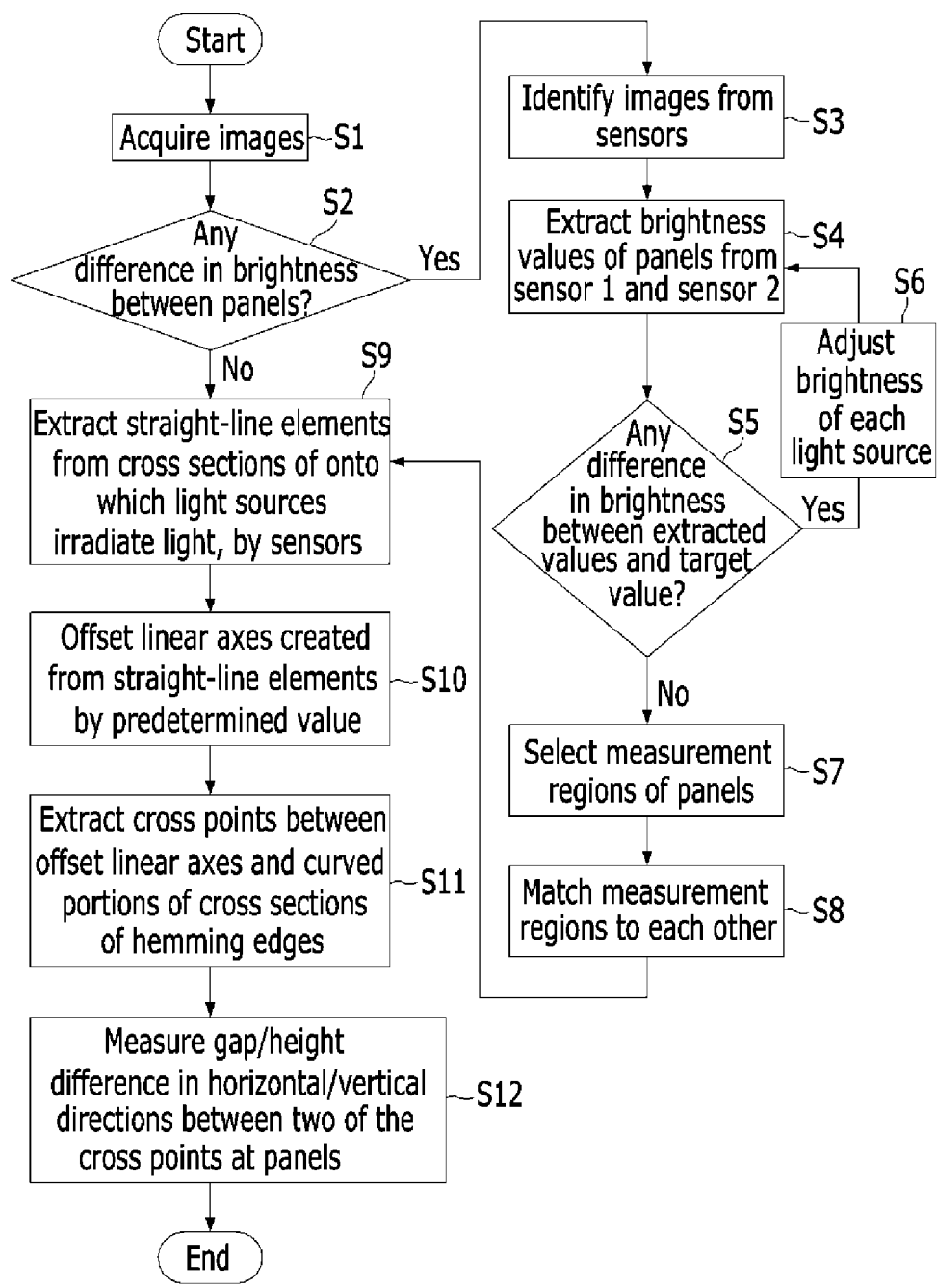
FIG. 4 is a control flowchart for explaining a control method of the gap/height difference measurement module according to the exemplary embodiment of the present invention.

FIG. 4 is a control flowchart for explaining a control method of the gap/height difference measurement module according to the exemplary embodiment of the present invention.

Referring to the drawing, the control method of the gap/height difference measurement module according to the exemplary embodiment of the present invention includes (a) acquiring images of the panels P1 and P2 which require gap/height difference measurement, and detecting any difference in brightness between the panels P1 and P2 due to different colors or chrome molding. (b) identifying images acquired by the first and second sensors 19 and 21 according to the difference in brightness between the panels P1 and P2 detected in the previous process, extracting the brightness values of the panels P1 and P2 and outputting them to the controller 30, detecting any difference between the extracted values between a target value set by the controller 30 by way of comparison and adjusting the brightness of the first and second light sources 15 and 17, and selecting measurement regions of the panels P1 and P2 and matching the measurement regions to each other. (c) extracting straight-line elements from cross sections of the panels P1 and P2 onto which the light sources 15 and 17 irradiate light, in the measurement regions of the panels P1 and P2 that are matched in the previous process and outputting them to the controller 300, and offsetting linear axes created from the extracted straight-line elements. (d) extracting cross points at curved portions of cross sections of the hemming edges of the panels P1 and P2, measuring the gap/height difference in horizontal/vertical directions between the extracted cross points, thereby finishing the control.

First, the controller 30 acquires hemming edge images of the panels P1 required to be measured, through the first and second sensors 19 and 21 (S1), and detects any difference in brightness between the panels P1 and P2, caused by different colors or chrome molding, based on the information acquired through the first and second sensors 19 and 21 (S2).

If any difference in brightness between the panels P1 and P2 is detected in the step S2, the controller 30 identifies the images acquired by the first and second sensors 19 and 21 (S3), and extracts the brightness values of the panels P1 and P2 from the first and second sensors 19 and 21 (S4).

Afterwards, the controller 30 detects any difference between the extracted values, which are detected and extracted from the first and second sensors 19 and 21, and a preset target value (S5).

If any difference between the extracted values and the target value is detected in the step S5, the controller 30 adjusts the brightness of the first and second light sources 15 and 17 (S6), and returns to the step S4 of extracting the brightness values of the panels P1 and P2 from the sensors 19 and 21.

On the other hand, when no difference is detected between the extracted values and the target value, the controller 30 selects measurement regions of the panels P1 and P2 (S7), and matches the measurement regions of the panels P1 and P2 selected in the step S7 to each other (S8).

As described above, the first light source 15 and the second light source 17 emit light of difference brightness at different wavelengths, and their brightness can be adjusted in response to a control signal from the controller 30.

If no difference in brightness is detected between the panels P1 and P2 in the steps S1 and S2 of the process (a), or after the steps S3 through S8 of the process (b) are carried out, the process (c) is carried out.

In the process (c), the sensors 19 and 21 extract straight-line elements from the cross sections of the panels P1 and P2 onto which the light sources 15 and 17 irradiate light, in the matched measurement regions of the panels P1 and P2, and output them to the controller 30 (S9).

The controller 30 vertically offsets linear axes, created from the straight-line elements extracted in the step S9, by a predetermined value (S10), and extracts the cross points between the offset linear axes and the curved portions of the cross sections of the hemming edges of the panels P1 and P2 (S11).

Afterwards, the controller 30 measures the horizontal gap between two of the cross points extracted in the step S12 and the vertical height difference between them, and completes the measurement of the gap/height difference between the hemming edges of the panels P1 and P2, thereby finishing the control (S12).

Accordingly, the thus-configured gap/height difference measurement module 1 for the vehicle and the control method thereof according to the exemplary embodiment of the present invention are configured to allow sensors 19 and 21 to each detect light of different brightness, even when light of different brightness irradiated onto panels P1 and P2 with different colors or with chrome molding through light sources 15 and 17 is scattered over the panels P1 and P2 with different colors or with chrome molding, so as to accurately extract straight-line elements from cross sections formed through the panels P1 and P2 by the light of different brightness emitted from the light sources 15 and 17 and accurately measure the gap/height difference between the hemming edges of the panels P1 and P2.

As the gap/height difference between the hemming edges of the panels P1 and P2 can be accurately measured, improvements in measurement accuracy and measurement reliability can be achieved. Also, because the gap/height difference between the hemming edges of the panels P1 and P2 can be accurately measured regardless of whether the panels P1 and P2 are different in color and have chrome molding, the gap/height difference measurement module 1 for the vehicle and the control method thereof according to the exemplary embodiment of the present invention can be commonly used for many vehicle types.

Figure 5:
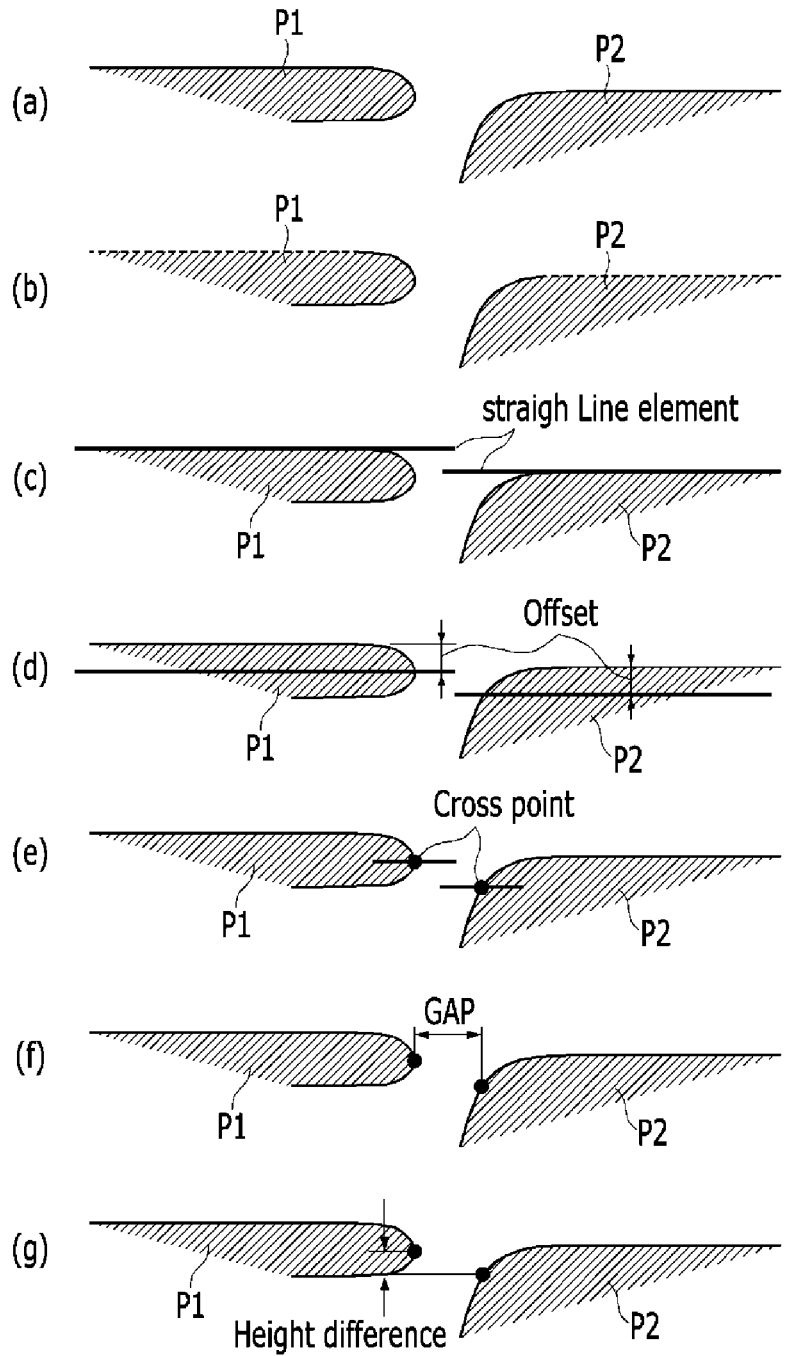
FIG. 5 is a sequence diagram sequentially showing the control method of the gap/height difference measurement module according to the exemplary embodiment of the present invention.

FIG. 5 is a sequence diagram sequentially showing the control method of the gap/height difference measurement module according to the exemplary embodiment of the present invention.

Referring to (a) of FIG. 5, cross sections of the first and second panels P1 and P2 are recognized, and referring to (b) and (c) of FIG. 5, straight-line elements are extracted from the straight portions of the first and second panels P1 and P2.

Referring to (d) of FIG. 5, the straight-line elements are offset by a predetermined value, and referring to (e) of FIG. 5, the cross points between the curved portions of the cross sections of the hemming edges of the first and second panels P1 and P2 and the offset straight-line elements are extracted.

Referring to (f) of FIG. 5, the gap between the cross points can be measured, and referring to (g) of FIG. 5, the height difference between the cross points can be measured.

In an exemplary embodiment of the present invention, the light source 15, 17 can be constituted by a laser type, and the laser type source adjusts its own laser density to be able to detect the gap and the height difference (flushness) of the vehicle body.

Further, the height difference can be called as "flushness" in an exemplary embodiment of the present invention.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A gap and height difference measurement module for a vehicle, which is configured to measure a gap and/or a height difference between hemming edges of panels assembled on a vehicle body, the gap and height difference measurement module including:
    a mounting frame with a flange mounted on a first end thereof and a connecting frame mounted on a second end of the mounting frame;
    first and second housings mounted on both sides of the connecting frame respectively;
    a first light source mounted on a lower end of the first housing and emitting light onto the panels;
    a second light source mounted on a lower end of the second housing and emitting light onto the panels;
    first and second sensors respectively mounted on front ends of the first and second housings; and
    first and second filters that are respectively mounted to the first and second sensors so as to allow the first and second sensors to each extract straight-line elements from cross sections formed as the lights emitted from the first and second light sources are irradiated onto the panels.

2. The gap and height difference measurement module of claim 1, wherein the first sensor extracts straight-line elements, through the first filter, from cross sections formed by the light emitted from the second light source and irradiated onto the panels, and outputs the straight-line elements to a controller.

3. The gap and height difference measurement module of claim 1, wherein the second sensor extracts straight-line elements, through the second filter, from cross sections formed by the light emitted from the first light source and irradiated onto the panels, and outputs the straight-line elements to a controller.

4. The gap and height difference measurement module of claim 1, wherein the first and second sensors detect lights emitted from the first light source and the second light source, respectively, which are diagonally mounted through the first and second housings.

5. The gap and height difference measurement module of claim 1, wherein the first and second sensors includes camera sensors, and the first and second filters are mounted on measurement portions through mounting caps, respectively.

6. The gap and height difference measurement module of claim 1, wherein the first light source and the second light source emit light of different brightness, and the brightness is adjusted in response to a control signal from a controller.

7. A control method of a gap and height difference measurement module, the control method comprising:
    (a) acquiring images of panels which require gap and/or height difference measurement, and detecting a difference in brightness between the panels due to different colors or chrome molding;
    (b) identifying images acquired by first and second sensors according to the difference in brightness between the panels detected in the process (a), extracting brightness values of the panels and outputting the brightness values to a controller, detecting a difference between the extracted values between a target value set by the controller by way of comparison and adjusting the brightness of first and second light sources, and selecting measurement regions of the panels and matching the measurement regions to each other;
    (c) extracting straight-line elements from cross sections of the panels onto which the first and second light sources irradiate light, in the measurement regions of the panels that are matched in the process (b) and outputting straight-line elements to the controller, and offsetting linear axes created from the extracted straight-line elements; and
    (d) extracting cross points at curved portions of cross sections of hemming edges of the panels, measuring the gap and/or the height difference in horizontal and/or vertical directions between the extracted cross points,
    wherein the process (b) comprises:
    when the difference in brightness between the panels is detected in the process (a), identifying the images acquired by the first and second sensor;
    extracting the brightness values of the panels from the first and second sensors;
    detecting the difference between the extracted brightness values, which are detected and extracted from the first and second sensors, and the target value;
    when the difference between the extracted brightness values and the target value is detected, adjusting the brightness of the first and second light sources, and returning to a process of the extracting of the brightness values of the panels from the first and second sensors;
    when no difference is detected between the extracted brightness values and the target value, selecting measurement regions of the panels; and
    matching the measurement regions of the panels selected in the process (b) to each other.

8. The control method of claim 7, wherein the process (a) comprises:
    acquiring hemming edge images of the panels required to be measured, through the first and second sensors; and
    detecting the difference in brightness between the panels, caused by the different colors or the chrome molding, based on information acquired through the first and second sensors.

9. The control method of claim 7, wherein the first and second sensors includes camera sensors, and the first and second filters are mounted on the measurement portions through mounting caps, respectively.

10. The control method of claim 7, wherein the first light source and the second light source emit light of different brightness, and brightness of the first light source and the second light source is adjusted in response to a control signal from the controller.

11. A control method of a gap and height difference measurement module, the control method comprising:
- (a) acquiring images of panels which require gap and/or height difference measurement, and detecting a difference in brightness between the panels due to different colors or chrome molding;
- (b) identifying images acquired by first and second sensors according to the difference in brightness between the panels detected in the process (a), extracting brightness values of the panels and outputting the brightness values to a controller, detecting a difference between the extracted values between a target value set by the controller by way of comparison and adjusting the brightness of first and second light sources, and selecting measurement regions of the panels and matching the measurement regions to each other;
- (c) extracting straight-line elements from cross sections of the panels onto which the first and second light sources irradiate light, in the measurement regions of the panels that are matched in the process (b) and outputting straight-line elements to the controller, and offsetting linear axes created from the extracted straight-line elements; and
- (d) extracting cross points at curved portions of cross sections of hemming edges of the panels, measuring the gap and/or the height difference in horizontal and/or vertical directions between the extracted cross points, wherein the process (c) comprises:
when no difference in brightness is detected between the panels in the process (a), or after the process (b) is carried out, extracting the straight-line elements from the cross sections of the panels onto which the first and second light sources irradiate light, in the measurement regions of the panels that are matched in the process (b) and outputting the straight-line elements to the controller; and
vertically offsetting linear axes created from the extracted straight-line elements.

12. A control method of a gap and height difference measurement module, the control method comprising:
- (a) acquiring images of panels which require gap and/or height difference measurement, and detecting a difference in brightness between the panels due to different colors or chrome molding;
- (b) identifying images acquired by first and second sensors according to the difference in brightness between the panels detected in the process (a), extracting brightness values of the panels and outputting the brightness values to a controller, detecting a difference between the extracted values between a target value set by the controller by way of comparison and adjusting the brightness of first and second light sources, and selecting measurement regions of the panels and matching the measurement regions to each other;
- (c) extracting straight-line elements from cross sections of the panels onto which the first and second light sources irradiate light, in the measurement regions of the panels that are matched in the process (b) and outputting straight-line elements to the controller, and offsetting linear axes created from the extracted straight-line elements; and
- (d) extracting cross points at curved portions of cross sections of hemming edges of the panels, measuring the gap and/or the height difference in horizontal and/or vertical directions between the extracted cross points, wherein the process (d) comprises:
extracting the cross points between offset linear axes and the curved portions of the cross sections of the hemming edges of the panels; and
measuring a horizontal gap between two of the cross points extracted in the process (d) and a vertical height difference between the two of the cross points, and completing the measurement of the gap and/or the height difference between the hemming edges of the panels.

13. A control method of a gap and height difference measurement module, the control method comprising:
- (a) acquiring images of panels which require gap and/or height difference measurement, and detecting a difference in brightness between the panels due to different colors or chrome molding;
- (b) identifying images acquired by first and second sensors according to the difference in brightness between the panels detected in the process (a), extracting brightness values of the panels and outputting the brightness values to a controller, detecting a difference between the extracted values between a target value set by the controller by way of comparison and adjusting the brightness of first and second light sources, and selecting measurement regions of the panels and matching the measurement regions to each other;
- (c) extracting straight-line elements from cross sections of the panels onto which the first and second light sources irradiate light, in the measurement regions of the panels that are matched in the process (b) and outputting straight-line elements to the controller, and offsetting linear axes created from the extracted straight-line elements; and
- (d) extracting cross points at curved portions of cross sections of hemming edges of the panels, measuring the gap and/or the height difference in horizontal and/or vertical directions between the extracted cross points, wherein the first sensor is mounted on one and the other ends of the first light source and a first housing, and the second sensor is mounted on one and the other ends of the second light source and a second housing, and
wherein the first and second sensors detect light emitted from the first light source and the second light source, respectively, which are diagonally mounted through the first and second housings.

* * * * *